United States Patent [19]

Hingst

[11] 4,041,782

[45] Aug. 16, 1977

[54] HOOD-MOUNTABLE DIGITAL SPEEDOMETER

[76] Inventor: Elmer J. Hingst, 521 Center St., Waukegan, Ill. 60085

[21] Appl. No.: 711,418

[22] Filed: Aug. 3, 1976

[51] Int. Cl.² .......................... G01P 1/06; G01P 1/08
[52] U.S. Cl. ...................................... 73/493; 73/499; 116/116
[58] Field of Search ............ 73/499, 493; 177/210 R, 177/DIG. 3; 340/347 P; 116/116

[56] References Cited

U.S. PATENT DOCUMENTS

| 1,284,091 | 11/1918 | Gore | 73/499 X |
| 1,491,347 | 4/1924 | Goldman | 73/499 X |
| 2,887,679 | 5/1959 | Curva | 73/499 X |
| 3,853,191 | 12/1974 | Yamagiwa | 177/DIG. 3 |

FOREIGN PATENT DOCUMENTS

| 183,865 | 4/1918 | Canada | 73/499 |
| 572,661 | 3/1959 | Canada | 73/499 |

Primary Examiner—James J. Gill

[57] ABSTRACT

A digital speedometer includes analog-to-digital converter means which may be coupled to a speed-indicator of a vehicle-mounted speedometer for converting a position of the speed indicator into a binary number which is displayed, upon being converted into a decimal number, on a display means mounted on the hood of a vehicle.

3 Claims, 3 Drawing Figures

U.S. Patent
Aug. 16, 1977
4,041,782
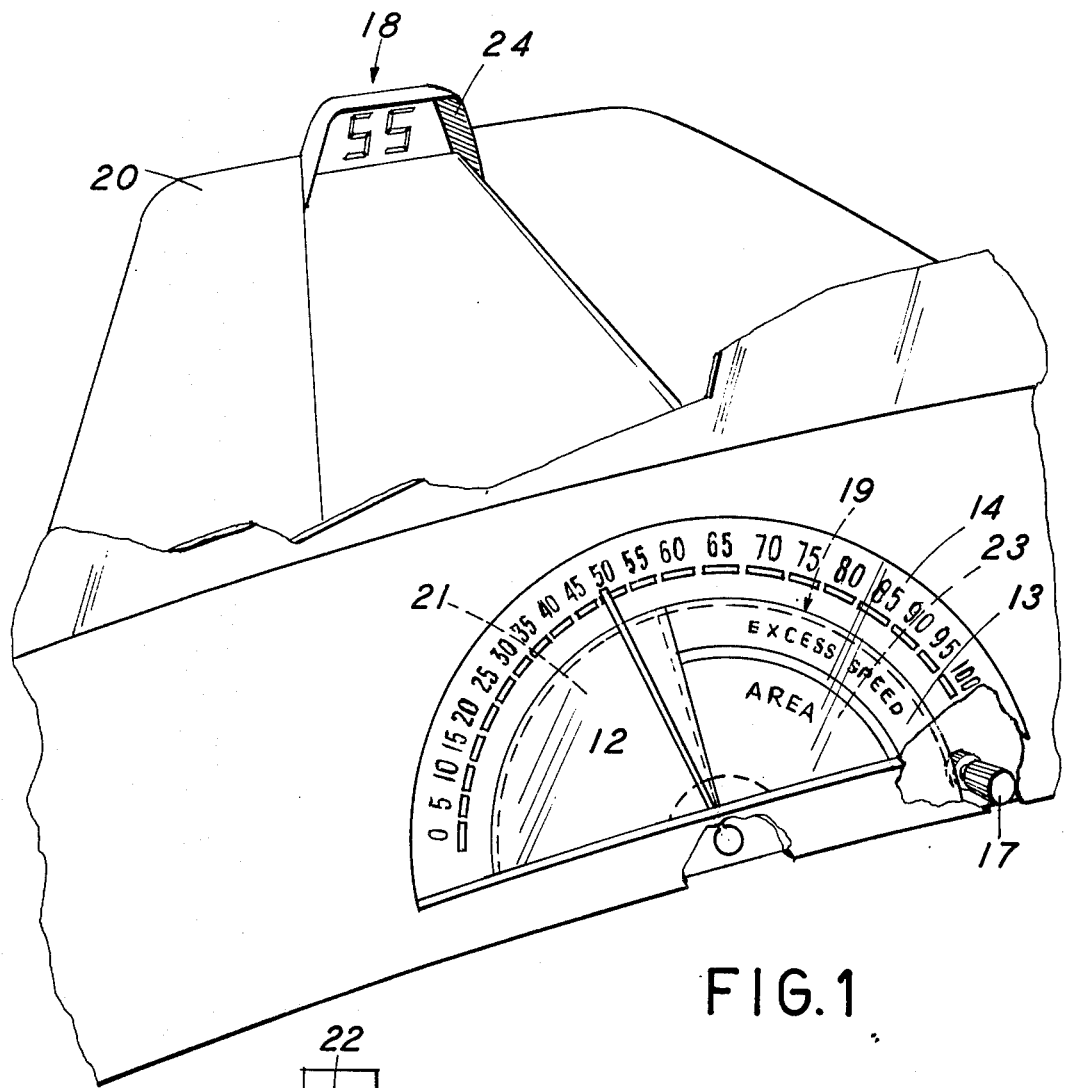
FIG.1
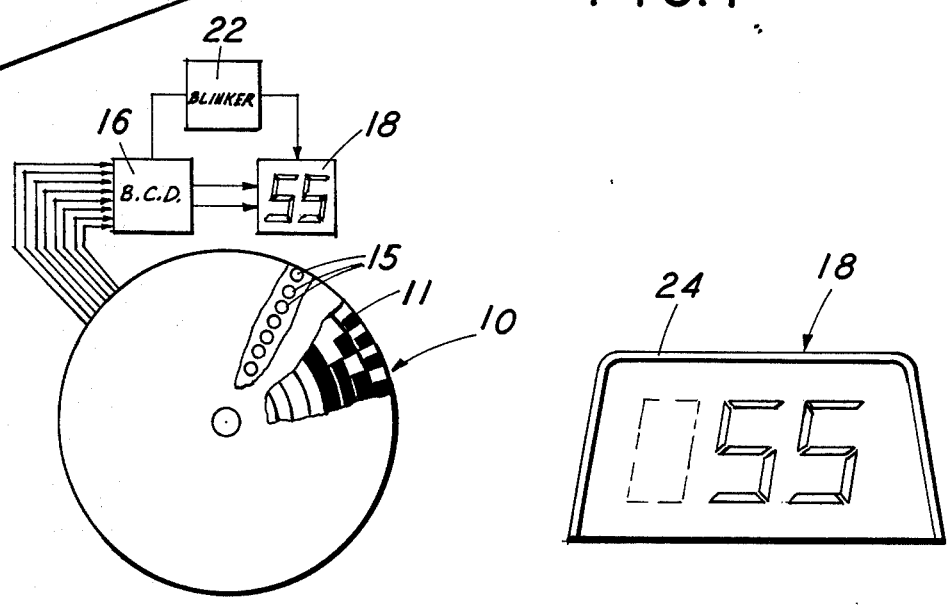
FIG.2
FIG.3

HOOD-MOUNTABLE DIGITAL SPEEDOMETER

BACKGROUND OF THE INVENTION

1. Field of the Invention

The field of the present invention relates to a hood-mountable digital speedometer.

2. Description of the Prior Art

A vehicle-indicator optical projection-device is known in which a portion of a speedometer is projected on a semi-reflective windshield; there is also known a line-of-sight speedometer mounted in an elevated position on the dashboard. Also known is a vehicle roof mounted speedometer which shows other drivers the speed of a vehicle, such as a police car. All of the above devices are relatively costly.

SUMMARY OF THE INVENTION

It is accordingly an object of my present invention to devise a speedometer which is disposed in the line-of-sight of a driver, which is easily readable, and which does not require the driver to deflect his glance from objects on the road.

I accordingly provide a hood-mountable digital speedometer which includes analog-to-digital converter means which may be coupled to a speed-indicator of a vehicle-mountable speedometer, for converting a position of the speed-indicator into a binary number, binary-to-decimal number converter means connected to the analog-to-digital converter means for converting the binary number into a decimal number, and display means mouunted on the hood of a vehicle for displaying the decimal number; the display means is thus disposed in a direct line-of-vision of a vehicle operator. The speed-indicator may occupy a position of excessive speed of the speedometer, and in one version of my invention the analog-to-digital converter means converts only the position of the speed-indicator in the excessive speed-region to the binary number. In a preferred version of my invention a blinker circuit is connected between the analog-to-digital converter means and the display means for periodically flashing the displayed decimal number on and off when the speed-indicator occupies a position in the excessive speed region. A shield is preferably mounted on the display means for shielding the latter from extraneous light.

BRIEF DESCRIPTION OF THE DRAWINGS

My invention will be better understood with reference to the accompanying drawing in which FIG. 1 shows a perspective view of a vehicle having a speedometer and a slave digital-speedometer mounted on its hood;

FIG. 2 shows a block circuit diagram of the analog-to-digital converter means connected to a binary-to-decimal converter and to a digital indicator via a blinker circuit; and FIG. 3 shows an elevational view of the digital speedometer.

DESCRIPTION OF THE PREFERRED EMBODIMENT

Referring now to the drawing, a hood-mountable visual speedometer includes analog-to-digital converter means 1 which may be coupled to a speed-indicator 12 of a vehicle-mounted speedometer 14 for converting a position of the speed-indicator 12 into a binary number. In the example shown, the speedometer is substantially semi-circular and the speed-indicator thereof, indicated as 12 in FIG. 1, is rotationally coupled to the analog-to-digital converter means 10, shown in FIG. 2. The analog-to-digital converter means is well understood and will not be described in further detail here except to say that the conversion from an analog position to a digital number may be accomplished, for example, by a non-illustrated light source shining through a disc 11 which has a multiplicity of alternately transparent and non-transparent regions, corresponding, as viewed from the center to an outward portion thereof to the digital number representing at the time the angular position of the speed-indicator. Depending on whether light is passing through a transparent region of the disc 11 or not, a respective photo-detector 15 will be energized and transmit an output to a binary-to-decimal converter 16. The display means 18 will therefore show a digital indication of the speed in either miles per hour or kilometers per hour. The display means 18 are mounted on the hood 20 of a vehicle to display the decimal number so that the display means 18 is disposed in a direct line-of-vision of an operator of the vehicle. In one version of my invention, the speed indicator 12, when in a region 13 of excessive speed of the speedometer 14, converts its position, i.e. in the example shown its angular position, to a binary number only in that excessive speed area. This may be done, for example, by blocking off the light of the non-illustrated light source from impinging on the photodetectors 15 when the speed indicator 12 is not in the excessive speed region. This may in turn be accomplished, for example, by interposing a disc 19 between the light source and the disc 11, the disc 19 having an opaque or non-transparent region 21, and a transparent region 23. The commencement of an excessive speed limit may be adjusted for example, by an excess speed-adjustment knob 17 which rotates the disc 19 so as to set the beginning of the excessive speed area to a required speed limit.

In order to draw the attention of the driver to the fact that he is operating the vehicle at an excessive speed, a blinker or flash-circuit 22 may be interconnected between the binary-to-decimal converter 16 and the display means 18; such a blinker or flash-circuit is well known in the art and will not be further described here. It is preferable to dispose a shield 24 to cover the visual display means 18 so that the latter is shielded from extraneous light and can be read clearly by the operator of the vehicle.

Although the invention has been described with respect to a preferred version thereof, it is to be understood that it is not to be so limited since changes can be made therein which are within the full intended scope of the appended claims.

What is claimed is

1. A hood-mountable digital speedometer comprising:
    analog-to-digital converter means couplable to a speed-indicator of a vehicle-mountable speedometer for converting a position of the speed-indicator into a binary number;
    binary-to-decimal number converter means connected to said analog-to-digital converter means for converting the binary number into a decimal number, wherein the speed-indicator is movable over a region of excessive speed of the speedometer, and said analog-to-digital converter means converts only the position of the speed-indicator in the excessive speed-region to the binary number;

display means mountable on the hood of a vehicle for displaying the decimal number; and a blinker circuit interconnected between said analog-to-digital converter means and said display means for periodically flashing the displayed decimal number on and off, whereby said display means is disposed in a direct line of vision of a vehicle operator.

2. A digital speedometer according to claim 1 further comprising a shield mountable on said display means for the shielding thereof from extraneous light.

3. A hood-mountable digital speedometer comprising:
analog-to-digital converter means, said analog-to-digital converter means including a disc formed with a multiplicity of alternately transparent and non-transparent regions, light from a light source being passable through said regions, a multiplicity of photodetectors disposed in the vicinity of said regions, each of said photo detectors being energizable upon the light passing through a corresponding one of the transparent regions, said analog-to-digital converter means being couplable to a speed-indicator of a vehicle-mounted speedometer for converting a position of the speed-indicator into a binary number;

binary-to-decimal number converter means connected to said photodetectors for converting the binary number into a decimal number, wherein the speed-indicator is movable over a region of excessive speed of the speedometer, and wherein said analog-to-digital converter means converts only the position of the speed-indicator in the excessive speed-region to the binary number; and display means mountable on the hood of a vehicle for displaying the decimal number, whereby said display means is disposed in a direct line-of-vision of a vehicle operator.

* * * * *